3,510,480
ANTICOCCIDIAL PYRIMIDINES
Edward F. Rogers, Middletown, and Robert L. Clark, Woodbridge, N.J., assignors to Merck & Co., Inc., Rahway, N.J., a corporation of New Jersey
No Drawing. Original application May 15, 1963, Ser. No. 280,703, now Patent No. 3,268,403, dated Aug. 23, 1966. Divided and this application Dec. 17, 1965, Ser. No. 514,679
Int. Cl. C07d 51/42
U.S. Cl. 260—240
1 Claim

ABSTRACT OF THE DISCLOSURE

Anticoccidial compounds of the formula:

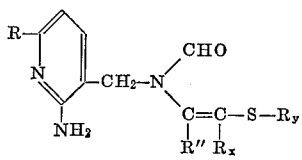

wherein R is a lower alkyl radical; R″ is hydrogen or a lower alkyl radical; $R_x$ is hydrogen or a lower alkyl radical; $R_y$ is

radical or $-SR_z$ radical, with $R_z$ being an alkyl or alkenyl radical and Ra being an alkyl, mononuclear aryl, alkaryl or ralkyl radical, and acid addition salts thereof are prepared by reacting a compound of the formula:

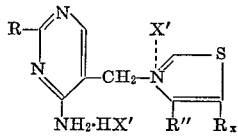

under alkaline conditions with a compound of the formula:

or

wherein X′ is chlorine or bromine.

---

This application is a division of co-pending application U.S. Ser. No. 280,703 filed May 15, 1963, now U.S. Pat. 3,268,403.

This invention relates to novel compounds and also to novel compositions of matter in which said compounds are present as components thereof and also to methods for using said compounds and compositions of matter. In one of its more specific aspects the invention is directed to novel compounds as well as novel compositions of matter which are useful in the treatment of the poultry disease, coccidiosis, and also to animal feeds and feed supplements containing as parts one or a combination of two or more of the novel compounds of this invention for the treatment and prevention of coccidiosis in poultry.

It has long been known that coccidiosis has been and still is a widespread poultry disease caused by species of protozoan parasites of the genus Eimeria, such as *E. tenella*, *E. necatrix*, *E. acervulina*, *E. maxima*, *E. hagani* and *E. brunetti*. *E. tanella* is the causative agent of a severe and often fatal infection of the ceca of chickens which is manifested by extensive hemorrhage, accumulation of blood in the ceca, and the passage of blood in the droppings. *E. necatrix* as well as certain other species attack the small intestine of the chick causing what is known as intestinal coccidiosis. Related species of coccidia such as *E. meleagridis* and *E. adenoides* are causative organisms of coccidiosis in turkeys. When left untreated, the severe forms of coccidiosis lead to poor weight gain, reduced feed mortality in fowl. The elimination or control of coccidiosis is therefore, of paramount importance in the poultry raising industry.

In our U.S. Pat. 3,088,867 issued on May 7, 1963, we disclose certain compounds which are eminently useful as anti-coccidial agents in the treatment of poultry and contain both a substituted pyrimidine ring and a thiazolium ring and some of which are of the following Formula I:

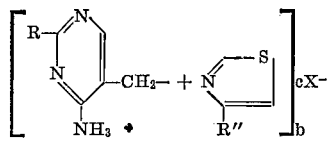

wherein R is a lower alkyl radical; R″ is hydrogen or a lower alkyl radical; X is an anion; and b and c are positive members having values such that the positive charge of b moles of cation is neutralized by c moles of anion X. Thus, for example, when X is a monovalent such as a halide, b is 1 and c is 2. The anion (designated as X) may be an inorganic ion such as chloride, bromide, iodide, nitrate, sulfate, phosphate and the like or the anion of an organic acid such as citric, tartaric, acetic, picric, stearic, succinic, bonzoic, phthalic, phenoxyacetic, embonic, abietic, 2-naphthalenesulfonic, ethylenediamine tetracetic acid tic, 2-naphthalenesulfonic, ethylenediamine tetracetic acid or the like. It may also be the anion of a polymer such as polyphosphate or polystyrenesulfonate ion. The nature of the anion is not critical since the activity of the quaternary salts is centered on the cationic portion of the compounds and therefor any anion may be employed so long as it is not unduly toxic for poultry. It will be readily realized by those skilled in the art that an addition salt of the primary amino group will be formed concurrently with the quaternary salt.

Said compounds of Formula I as well as certain homologs thereof are anti-coccidial agents. Said homologs differ from said compounds of Formula I by having a lower alkyl substituent at the 5 position of the thiazole ring which may or may not have a lower alkyl substituent at its 4 position. Said compounds of Formula I and said homologs thereof are synthesized by reacting an appropriately substituted pyrimide and thiazole or an appropriate alkylated thiazole. According to one process, a 2-lower alkyl-4-amino-5-halomethyl pyrimidine dihydrohalide in which the halogen is bromine or chlorine, is reacted directly with the thiazole or alkylated thiazole or alternatively organic solvents inert under the reaction conditions such as the lower alkanols, acetonitrile or an N,N-dilower alkyl alkanoamide may be employed as the reaction medium. The temperature is not critical and is preferred to carry out the process at about room temperature. The products precipitate out from the reaction mixture on standing at room temperature or on the addition of a suitable precipitant such as ether, ethyl acetate and the like and can be recovered by filtration or other conventional techniques.

The process may be represented as follows:

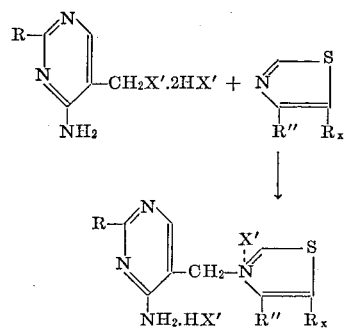

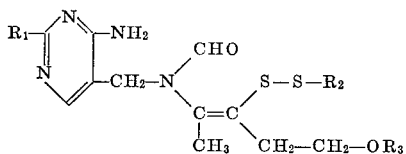

where R and R″ are as before defined; $R_x$ is hydrogen or a lower alkyl radical; and each X′ is chlorine or bromine. Compounds of reaction represented by the last formula above written as well as the free quaternary salts thereof, which are of the same formula as said last formula above written except that the HX′ is not present and was removed by neutralization, are preferably employed as starting materials and are referred to herein as Starting Materials (A) for the production of the novel compounds of this invention.

U.S. Pat. 2,833,768 of May 6, 1958 was issued to Montonori Fujiwara et al. who suggested that compounds of the following Formula II have "vitamin $B_1$-like activity":

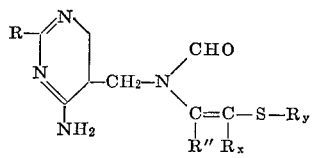

wherein $R_1$ is $CH_3$ or $C_2H_5$; $R_2$ is an alkyl, aralkyl or aryl group; and $R_3$ is a hydrogen atom or an acetyl or benzoyl group. According to the patentees, said compounds are derived from vitamin $B_1$ under alkaline conditions.

In the course of our experimentations we have produced a new class of compounds. The novel compounds of this invention are of the following Formula III:

and are also the anti-coccidially useful acid salts of said compounds of Formula III, wherein R, R″ and $R_x$ are as before defined; and $R_y$ is an acyl radical $$(R_a-CO)$$

or an —S—$R_z$ radical, with $R_a$ being a hydrocarbon radical whose maximum number of carbon atoms is 15 and preferably being alkyl, or mononuclear aryl, alkaryl or aralkyl and $R_z$ being an alkyl or alkenyl radical whose maximum number of carbon atoms is 12. It is to be understood that hereinafter and in the claims when compounds or a compound of Formula III is referred to or set forth, it is meant to include those of the above structural formula as well as the anti-coccidially acceptable acid salts thereof which are equivalents thereof.

The compounds of Formula III may be readily and easily produced from Starting Materials (A). In general they may be produced by reacting said Starting Materials (A) in an alkaline medium with an alkyl or alkenyl thiosulfinate of the formula:

or an organic acid halide of the formula:

wherein $R_z$, $R_a$ and X′ are as before defined. The reaction is carried out under alkaline conditions and at a pH no greater than 9 and generally at a pH of approximately 8. Under such conditions the thiazole ring of the Starting Materials (A) employed is opened and converted into a radical which may be represented as follows:

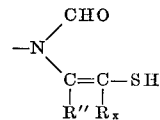

Specific examples of some of said thiosulfinates and organic acid halides given by way of illustration and not limitation are: allyl allylthiosulfonate, propyl propylthiosulfonate, methyl methylthiosulfonate, ethyl ethylthiosulfinate, isopropyl isopropylthiosulfonate, butyl butylthiosulfinate, isoamyl isoamylthiosulfinate, etc., benzoyl chloride, phenylacetyl chloride, tolyl chloride, tolylacetyl chloride, propionyl chloride, butyryl chloride, decanoyl chloride, etc.

If desired the resultant compound of Formula III is reacted with a desired acid in the conventional manner of producing acid salts thereby to provide the corresponding acid salt thereof.

The preferred compounds of the invention are derived from preferred Starting Materials (A) which are the 3-(2-lower alkyl-4-amino-5-pyrimidinylmethyl) - lower alkylated thiazolium quaternary salts having a lower alkyl radical in the 4 and/or 5-position of the thiazole ring. Included among these are the 3-(2-ethyl-4-amino-5-pyrimidinylmethyl)-5-methyl thiazolium salts, 3-(2-ethyl-4-amino-5-pyrimidinylmethyl)-4-methyl thiazolium salts, 3-(2 - ethyl-4-amino-5-pyrimidinylmethyl)-4,5 - dimethyl thiazolium salts, 3-(2-ethyl-4-amino-5-pyrimidinylmethyl)-5-methyl thiazolium salts, 3-(2-n - propyl-4 - amino-5-pyrimidinylmethyl)-4,5-dimethyl thiazolium salts.

We discovered that said novel compounds of Formula III, each, as shown, characterized by containing a substituted pyrimidine ring and containing no thiazolium ring as a part thereof, were nevertheless useful in the prevention and treatment of coccidiosis. The lack of a thiazolium ring in said compounds of Formula III is critically significant for the reason that the anti-coccidial Starting Materials (A) from which they are derived contain both the substituted pyrimidine and thiazolium rings as before set forth. We believe that we are the first to have discovered that said anti-coccidial compounds disclosed in said application and said homologs thereof or any other multiring anti-coccidial compound, one ring of which is thiazolium, which when employed as a starting material and under certain conditions treated with reactants thereby to provide novel compounds including a ring but containing no thiazolium ring as a part thereof would nevertheless still be useful for the prevention and treatment of coccidiosis in poultry.

As previously indicated the novel compounds of this invention when administered orally are effective in the treatment and prevention of coccidiosis in poultry. These compounds are most conveniently fed to poultry as a component of the feed or drinking water of the animals although they may also be administered orally dispersed or admixed with other carriers or diluents. According to one aspect of the invention, novel compositions are provided in which a novel compound of this invention is present as an anti-coccidial ingredient. Such compositions comprise a novel compound of this invention intimately dispersed in or admixed with an inert carrier or diluent. By inert carrier is meant one that is substantially non-reactive with respect to the compound of this invention physically coupled therewith and that may be administered orally with safety to the animals. The preferred compositions of this type, that is, where the compound of this invention is present as an anti-coccidial ingredient, are those in which the anticoccidially active ingredient is intimately dispersed or suspended in or admixed with the normal elements of poultry sustenance. By normal elements of poultry sustenance is meant the feed and drink normally partaken by the poultry such as grain, water and/or other liquids. However, as indicated above, compositions comprising a compound of this invention intimately dispersed in or admixed with any carrier or diluent which is substantially inert with respect thereto, orally ingestable and tolerated by the animals, may be satisfactorily employed.

The amount of novel compound of this invention required for the control of coccidiosis in poultry will, of course, vary somewhat, depending upon the specific compound or combination of two or more compounds of this invention employed. In general, the compounds of this invention are effective in the prevention of that disease without undesirable side effects when administered at levels at less than 0.05% by weight of the feed. With the novel compounds of this invention, the preferred class of which are those wherein $R_y$ is benzoyl, good prophylactic results are obtained when from about 0.0005% to about 0.05% by weight of the total feed consumed is administered; for most satisfactory results it is preferred that the poultry feed contain between about 0.0025% and 0.025% by weight of a compound of this invention. When the compounds of this invention are to be employed as therapeutic agents, the higher levels are used for relatively short periods of time. Thus, concentrations of about 0.02% to 0.05% by weight of the feed may be advantageously administered in treating an established outbreak of coccidiosis. When these novel compounds are employed as therapeutic agents it is desirable to employ the lowest levels that afford fully adequate control of coccidiosis in order to eliminate as far as possible any risk of side effects that might appear on prolonged feeding of the compound.

In the preparation of solid compositions a uniform dispersion or admixture of the chosen compound of this invention throughout the carrier can be readily effected by the usual methods of grinding, stirring, milling or tumbling. By altering the amount of drug added, and the carrier used, compositions of varying concentrations may be made to suit any purpose.

According to another aspect of the invention, novel compositions are provided in which the novel anticoccidally active ingredient is present in relatively large amounts which are suitable for addition to the poultry feed either directly or after an intermediate dilution or blending step. These compositions which are commonly referred to in the art as feed supplements and are a preferred feature of this invention provide a more convenient way of obtaining a uniform distribution in the feed of relatively small amounts of the active ingredient required or an effective dosage. Any orally ingestable solid carrier which is substantially inert with respect to the novel compound of this invention employed and tolerated by the animals may be satisfactorily employed. Examples of carriers or diluents suitable for such compositions are solid orally ingestable carriers such as distillers' dried grains, corn meal, citus meal, fementation residues, ground oyster shells, attapulgus clay, wheat shorts, molasses solubles, corn cob meal, edible vegetable substances, toasted dehulled soya flour, soybean mill feed, antibiotic mycelia, soya grits, crushed limestone and the like. The novel compounds of this invention are intimately dispersed or admixed throughout the solid inert carrier by methods such as grinding, stirring, milling or tumbling. By selecting proper diluents and by altering the ratio of carrier to active ingredient, compositions of any desired concentration may be prepared. Formulations containing from about 1% to about 40% by weight, and preferably from about 2-25% by weight, of active ingredient are particularly suitable for addition to poultry feed. The active novel compound is normally dispersed or mixed uniformly in the diluent but in some instances may be sorbed on the carrier. The optimal concentration of coc-cidiostat in these feed supplements will depend to some extent on the particular compound employed. Since it is convenient for the feed manufacturer to use about one pound of feed supplement for each ton of finished feed, the preferred concentration of any one of our coccidiostats in a feed supplement is partly a function of the level of active ingredient desired in the finished feed.

The following are examples of some of the compounds of the present invention and methods for producing them, all given by way of illustration and not limitation.

EXAMPLE 1

2-[2-n-propyl-4-amino-5-pyrimidinylmethylformamino]-$\Delta^1$-propenylallyldisulfide Dissolve 3 grams of Starting Material (A–1), 3-(2-propyl - 4 - amino - 5 - pyrimidinylmethyl) - 4 - methylthiazolium bromide hydrobromide, of the structural formula:

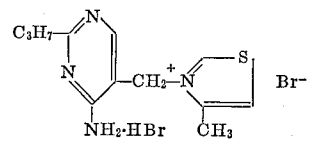

in a solvent consisting of 75 ml. of water and 75 ml. of alcohol. To said solution add 1.9 ml. of allyl allylthiosulfinate of the formula:

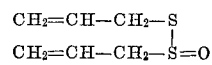

Then adjust and maintain the pH of said mass at 8 by the addition of sodium hydroxide thereto while slowly heating the mass to a temperature in the range of about 50–55° C. Then remove the source of external heat and permit the resultant mass to stand overnight in a room whose temperature was 70° F. The next morning remove in vacuo the alcohol from said resultant mass and extract the residue thereof with ether. Dry the ether solution over MgSO$_4$ and then remove the ether under vacuum at room temperature thereby leaving behind a semi-solid mass in the nature of a gummy solid and is a novel compound of this invention, known as Compound III–1 of the following formula:

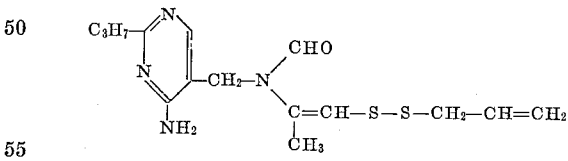

EXAMPLE 2

2-(1-[2-n-propyl-4-amino-5-pyrimidinylmethylformamino])-$\Delta^1$-propenylallyldisulfide Employ the same procedure and components as those of Example 1, except that in place of Starting Material (A–1) employ Starting Material (A–2), 3-(2-ethyl-4-amino - 5-pyrimidinylmethyl) - 5-methylthiazolium bromide hydrobromide thereby to produce novel compound of this invention, known as compound III–2, and the following formula:

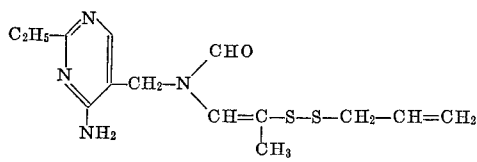

EXAMPLE 3

2-(3-[2-ethyl-4-amino-5-pyrimidinylmethylformamino])-
Δ²-butenyl allyldisulfide

Employ the same procedure and components as those of Example 1, except that in place of Starting Material (A–1), employ Starting Material (A–3), 3-(2-ethyl-4-amino - 5-pyrimidinylmethyl) - 4,5-dimethyl thiazolium bromide hydrobromide thereby to produce a novel compound of this invention known as compound III–3, and of the following formula:

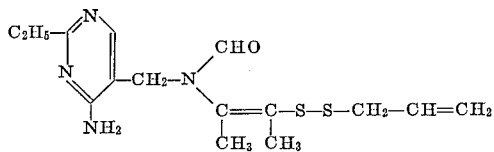

EXAMPLE 4

2-[2-n-propyl-4-amino-5-pyrimidinylmethylformamino]-
Δ¹-propenylpropyldisulfide

Dissolve 3 grams of Starting Material (A–1), in a solvent consisting of 75 ml. of water and 75 ml. of alcohol. To said solution add 1.9 ml. of propyl propylthiosulfinate, adjust and maintain the pH of the mass at 8 by the addition of sodium hydroxide thereto while slowly heating said mass to a temperature of 50–55° C. by the use of external heat. Remove the source of internal heat and permit the resultant mass to stand in a room whose temperature was 70° F. The next morning remove in vacuo the alcohol from said resultant mass and extract the residue thereof with petroleum ether. Upon standing crystalling material separated out of said petroleum ether extract, and was subsequently recrystallized from etherpetroleum ether and is known herein as Compound III–4. Its melting point was determined and found to be 73° C. This compound is of the same formula as that of Compound III–I except that a propyl radical is substituted for the allyl radical thereof.

EXAMPLE 5

2-[2-n-propyl-4-amino-5-pyrimidinylmethylformamino]-
Δ¹-propenylmethyldisulfide

Employ the same procedure and components as Example 4, except that for Starting Material (A–1), employ Starting Material (A–2) and instead of propyl propylthiosulfinate employ methyl methylthiosulfinate thereby to produce novel compound, hereinafter known as compound III–5, which is of the same formula as compound III–2 of Example 2, except that the allyl radical of compound III–2 is replaced by the methyl radical.

EXAMPLE 6

2-(3-[2 - ethyl - 4 - amino - 5 - pyrimidinylmethylformamino])-Δ²-butenyl ethyldisulfide Employ the same procedure and components as those of Example 4, except that for Starting Material (A–1), use Starting Material (A–3) and instead of propyl propylthiosulfinate use ethyl ethylthiosulfinate thereby to produce novel compound, known as compound III–6, and of the same formula as compound III–3 except that the allyl radical thereof is replaced by an ethyl radical.

EXAMPLE 7

2-[2-n-propyl - 4 - amino - 5 - pyrimidinylmethylformamino]-propenylthiolbenzoate Dissolve 5 grams of Starting Material (A–1), in 35 ml. of water. To said solution add 17 ml. of 2.5 N sodium hydroxide thereby causing a yellow oily liquid to form. Add dioxane until the entire mass becomes a yellow solution. While constantly stirring said yellow solution add thereto over a ten minute period a solution of 3.5 ml. of benzoyl chloride in 10 ml. of ether. During said addition add periodically 2.5 N sodium hydroxide to keep the stirred mixture at a pH of about 8. After said period continue the stirring of the mass for 90 minutes and then extract with ether three times. Water wash and dry said extracts over magnesium sulfate and evaporate thereby leaving behind an oily liquid residue. Rub the residue with several portions of petroleum ether, then with ether whereby the oily liquid residue becomes solid. Crystallize the solid from benzene-petroleum ether thereby to obtain a crystalling product, which is a novel compound of this invention, known as compound III–7, and having a melting point of 155°–156° C., and being of the following formula:

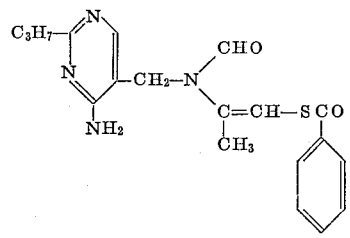

EXAMPLE 8

2-(3-[2-n-propyl - 4 - amino - 5 - pyrimidinylmethylformamino]-Δ²-butenylthioltolylacetate Following the same procedure and components as those of Example 7, except that for Material (A–1), employ Material (A–4), 3-(2 - n - propyl-4-amino-5-pyrimidinylmethyl)-4,5-dimethyl thiazolium bromide hydrobromide and for benzoyl chloride, use tolylacetyl chloride thereby to obtain a novel compound, known as compound III–8, of the following formula:

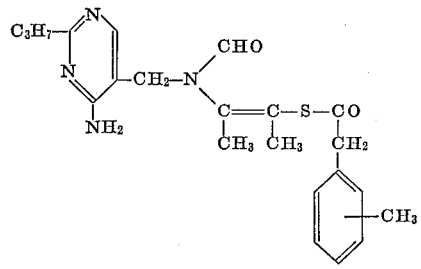

EXAMPLE 9

2-[2-n-propyl - 4 - amino - 5 - pyrimidinylmethylformamino]-propenylthiolacetate Follow the same procedure and components as those of Example 7, except that for the 3.5 ml. of benzoyl chloride use 2 ml. of acetyl chloride thereby to obtain a novel compound, known as compound III–9 of the same formula as compound III–7, except that the methyl radical is substituted for the phenyl radical thereof.

EXAMPLES 10 and 11

2-[2-n-propyl - 4 - amino - 5 - pyrimidinylmethylformamino]-ethenylallyldisulfide 2-[2-n-propyl - 4 - amino - 5 - pyrimidinylmethylformamino]-ethenylthiolbenzoate Follow the same procedure and components of those of Examples 1 and 7 respectively except that instead of Starting Material (A–1), employ Starting Material (A–5), 3-(2-propyl-4-amino-5 - pyrimidinylmethyl) - thiazolium bromide hydrobromide thereby to provide novel compounds, known as compound III–10 and III–11 respectively which are respectively the same as compound III–1 and III–7 respectively except that in each the methyl radical is replaced by a hydrogen atom.

Many other compounds of Formula III may be produced by following the general procedures of the type illustrated in Examples 1–11 herein and varying the specific Starting Materials (A) and/or the sulfinates or acyl chlorides employed therein.

Any departure from the specific descriptions as hereinbefore set forth and which conforms to the present invention is intended to be included within the scope of the claim.

We claim:
1. A compound selected from the group consisting of compounds of the formula:

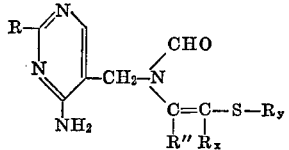

and acid salts thereof, wherein R is a lower alkyl radical; R″ is selected from the group consisting of hydrogen and lower alkyl radicals; $R_x$ is selected from the group consisting hydrogen and lower alkyl radicals and $R_y$ is benzoyl.

References Cited

UNITED STATES PATENTS 2,752,348   6/1956   Matsukawa et al. ___ 260—256.5
2,833,768   5/1958   Fujiwara et al. ____ 260—256.5

OTHER REFERENCES

Williams et al., The Biochemistry of B Vitamins, pp. 687 and 694–695, Reinhold Pub. Corp., New York (1950).

Rogers et al., J. Am. Chem. Soc., vol. 82, pp. 2974–2975 (1960).

JOHN D. RANDOLPH, Primary Examiner

U.S. Cl. X.R.

99—2, 4; 424—255; 260—256.5